United States Patent
Abdelilah et al.

(10) Patent No.: US 6,757,325 B1
(45) Date of Patent: Jun. 29, 2004

(54) METHODS, MODEMS AND COMPUTER PROGRAM PRODUCTS FOR IDENTIFICATION OF A MODEM TYPE AND ADJUSTMENT OF A COMMUNICATION CONFIGURATION BASED ON MODEM TYPE

(75) Inventors: Youssef Abdelilah, Holly Springs, NC (US); Gordon Taylor Davis, Chapel Hill, NC (US); Ajay Dholakia, Gattikon (CH); Dongming Hwang, Cary, NC (US); Fredy D. Neeser, Langnau (CH); Robert John Schule, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,698
(22) Filed: Oct. 29, 1999
(51) Int. Cl.[7] ................................................. H04L 5/16
(52) U.S. Cl. ...................................................... 375/222
(58) Field of Search ................................. 375/222, 296, 375/345; 381/43; 340/928

(56) References Cited

U.S. PATENT DOCUMENTS

| | | | |
|---|---|---|---|
| 4,979,211 A | * 12/1990 | Benvenuto et al. | 704/233 |
| 5,187,732 A | 2/1993 | Suzuki | 379/5 |
| 5,311,578 A | 5/1994 | Bremer et al. | 379/97 |
| 5,317,594 A | 5/1994 | Goldstein | 375/8 |
| 5,353,280 A | 10/1994 | Ungerböck | 370/32.1 |
| 5,491,720 A | 2/1996 | Davis et al. | 375/222 |
| 5,732,104 A | 3/1998 | Brown et al. | 375/222 |
| 5,751,796 A | 5/1998 | Scott et al. | 379/93.31 |
| 5,796,808 A | 8/1998 | Scott et al. | 379/93.31 |
| 5,852,630 A | * 12/1998 | Langberg et al. | 375/219 |
| 5,852,631 A | 12/1998 | Scott | 375/222 |
| 5,887,027 A | 3/1999 | Cohen et al. | 375/222 |
| 5,926,506 A | 7/1999 | Berthold et al. | 375/222 |

* cited by examiner

Primary Examiner—Stephen Chin
Assistant Examiner—Curtis Odom
(74) Attorney, Agent, or Firm—Myers, Bigel, Sibley & Sajovec, P.A.; Scott W. Reid (57) ABSTRACT

Methods, modems and computer program products for detecting whether a remote modem is of a particular design type and for adjusting the communication configuration for a communication session based on a type of the remote modem. The modem type is recognized based on a knowledge that the modem design of certain manufacturers has a unique associated data pattern contained within the startup communication sequence which is not specified by the protocol but which can be demodulated and detected to thereby recognize that the remote modem is a particular manufacturer's design type. Based on knowledge of the characteristics of the remote modem design, various steps are taken which may improve performance of the communication connection in light of the particular modem design's characteristics. For example, a different Total Harmonic Distortion (THD) threshold may be used for falling back to V.34 communications when the remote modem design only supports up to 2 look ahead for spectrum shaping.

39 Claims, 5 Drawing Sheets

METHODS, MODEMS AND COMPUTER PROGRAM PRODUCTS FOR IDENTIFICATION OF A MODEM TYPE AND ADJUSTMENT OF A COMMUNICATION CONFIGURATION BASED ON MODEM TYPE

FIELD OF THE INVENTION

The present invention relates generally to the field of modems, and, more particularly, to modem startup protocols.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the public switched telephone network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has been very slow due to the substantial investment required of network providers for new equipment. Because ISDN is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g, an individual subscriber in a home, office, or hotel) to the telephone company's central office (CO). In recent years, local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (ie., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions outside of the conversion made at the subscriber's modem to enable transmission at 56 kbps.

Figure 1:
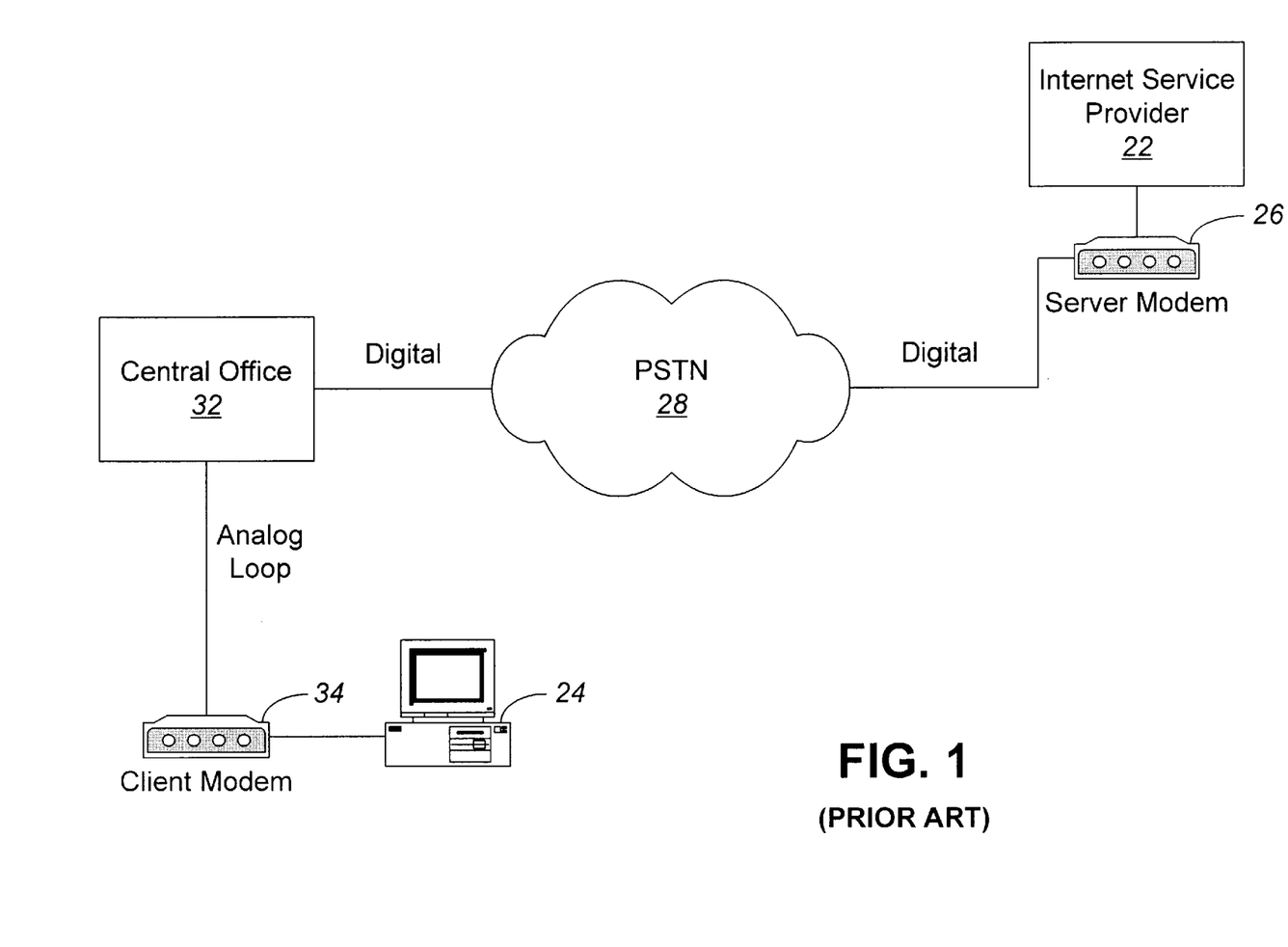
FIG. 1 is a block diagram illustrating a typical V.90 connection between a subscriber and an ISP in accordance with the prior art.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Figure 2:
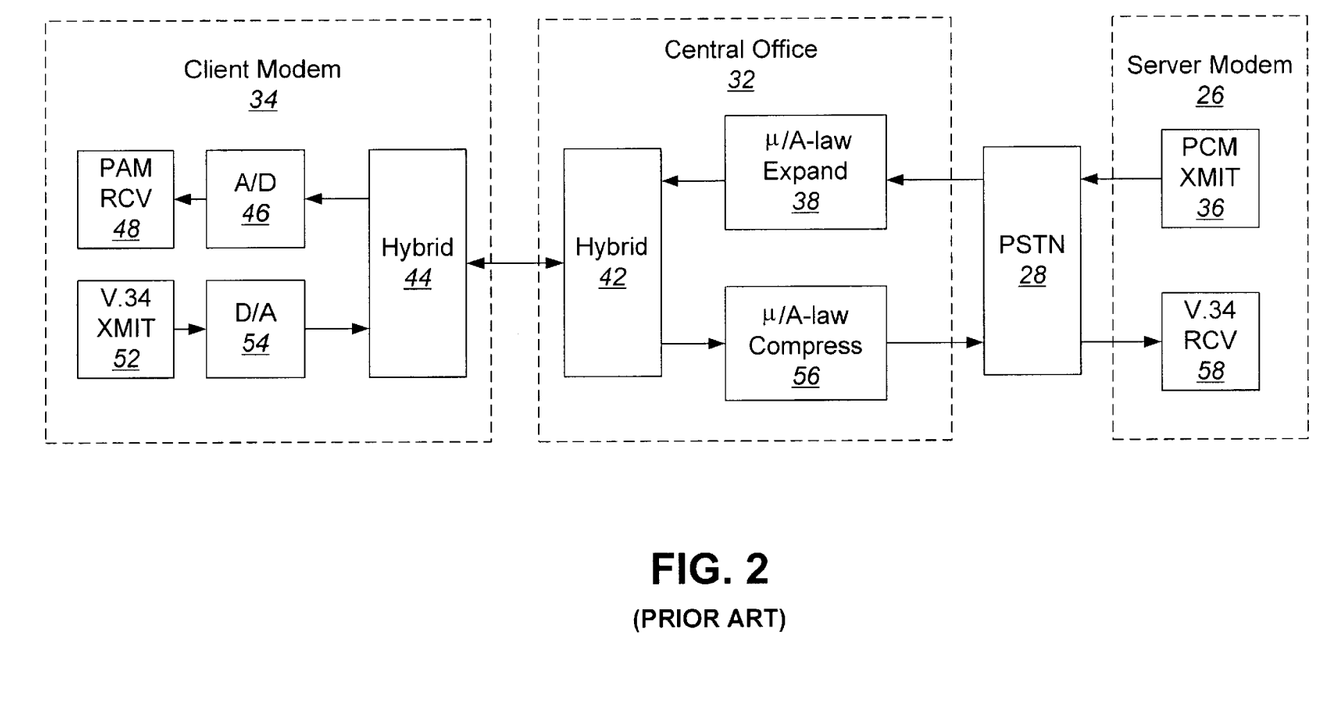
FIG. 2 is a detailed block diagram of the internal architecture and connections between the client modem, the central office, and the server modem of FIG. 1.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN 28 by the PCM transmitter 36 where they are received by a network codec. The PCM data is then transmitted through the PSTN 28 until reaching the central office 32 to which the client modem 34 is connected. Before transmitting the PCM data to the client modem 34, the data is converted its current form as either $\mu$-law or A-law companded PCM codewords to pulse amplitude modulated (PAM) voltages by the codec expander (digital-to-analog (D/A) converter) 38.

These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56kbps, there must be only a single digitalto-analog conversion and subsequent analog-to-digital conversion between the server modem 26 and the client modem 34. Recall that analog-to-digital conversions in the PSTN 28 can introduce quantization noise, which may limit the data rate as discussed previously. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard only offers increased data rates (e.g., data rates up to 56 kbps) in the downstream direction from a server to a subscriber or client. Upstream communication still takes place at conventional data rates as provided for in the V.34 standard. Nevertheless, this asymmetry is particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists of mainly keystroke and mouse commands, which are readily handled by the conventional rates provided by the V.34 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path within the network. Nevertheless, other digital impairments, such as robbed bit signaling (RBS) and digital mapping through PADs which results in attenuated signals, can also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Articles such as Humblet et al., "The Information Driveway," IEEE Communications Magazine, December 1996, pp. 64–68, Kalet et al., "The Capacity of PCM Voiceband Channels," IEEE International Conference on Communications '93, May 23–26, 1993, Geneva, Switzerland, pp. 507–511, Fischer et al., "Signal Mapping for PCM Modems," V-pcm Rapporteur Meeting, Sunriver, Oreg., USA, Sep. 4–12, 1997, and Proakis, "Digital Signaling Over a Channel with Intersymbol Interference," Digital Communications, McGraw-Hill Book Company, 1983, pp. 373, 381, provide general background information on digital communication systems.

While the V.90 standard (recommendation), like V.34, defines various requirements allowing modems from a variety of manufacturers to communicate, there is still variability between different modem designs as provided by different modem manufacturers. Some of the variations in modem design are specifically provided for by the V.90 standard. For example, bits 12 through 20 of the $INFO_0$ signal are specified as flags characterizing various modem support capabilities as described in Table 7 of the V.90 standard. Other differences between modem designs exist beyond those specified by the standard. These differences can impact the data rate which may be obtained when modems of different types are connected both during the startup procedures and during the subsequent communication session. The impact of these differences may also vary depending upon choices made in the V.90 startup procedures. However, the V.90 protocol does not specify a requirement for communication of the manufacturer (i.e., design type) of a modem during startup procedures. While it is known in other arts, for example, with cable modems, to provide a unique identifier for a cable modem, this identifier is typically associated with a particular cable modem unit not a design type of a cable modem. In addition, U.S. Pat. No. 5,317,594 proposed a modification to a startup protocol to include transmission of a predetermined signal to allow modems conforming with the V.fast standard to recognize that they are communicating with another modem conforming to the V.fast standard. However, this is not an identification of a design type of a modem but rather specifies a supported protocol. U.S. Pat. No. 5,311,578 proposed inclusion of a low level identification signal as a tone hidden within a CCITT V.25 answer tone to allow use of a non-standard handshaking procedure. However, this typically requires both the call and answer modem to be configured to transmit and receive the identification signal tone, for example, with a tone detector.

Accordingly, variations in design type of modems on any given communication session may still result in a less than optimal connection being established during startup. Accordingly, there exists a need for improvements in modem technology to allow modems, particularly modems such as V.90 modems, to achieve more closely their theoretical maximum data rate.

SUMMARY OF THE INVENTION

It is an object of the present invention to provide modems which may be able to identify the type of a connected modem during startup procedures.

It is a further object of the present invention to provide modems which may utilize knowledge of the type of a connected modem to improve or optimize the configuration of a communication connection.

These and other objects, advantages, and features of the present invention are provided by methods, systems and computer program products for detecting whether a remote modem is of a particular design type and methods, systems and computer program products for adjusting the communication configuration for a communication session based on a type of the remote modem. The modem type is recognized based on a knowledge that the modem design of certain manufacturers has a unique associated data pattern contained within the startup communication sequence which is not specified by the protocol but which can be demodulated and detected to thereby recognize that the remote modem is a particular manufacturer's design type. Based on knowledge of the characteristics of the remote modem design, various steps are taken which may improve performance of the communication connection in light of the particular modem design's characteristics. For example, a different Total Harmonic Distortion (THD) threshold may be used for falling back to V.34 communications when the remote modem design only supports up to 2 bit look ahead for spectrum shaping.

In one embodiment of the present invention, a method is provided for detecting at a local modem whether a remote modem is a first type of modem, the first type of modem having a unique associated modem type data. A received signal from the remote modem is demodulated to provide data associated with the received signal. The data associated with the received signal is then compared with the unique associated modem type data to determine whether the remote modem is a first type of modem. In a particular embodiment, the local modem and the remote modem are at least one of a V.34 or a V.90 modem and the received signal is a phase 2 startup signal. More particularly, the received signal may be a fill bit field of $INFO_1$ and the number of fill bits associated with the fill bit field may be provided as the data associated with the received signal. The remote modem is determined to be a first type of modem based on the number of fill bits associated with the fill bit field. More particularly, the fill bit field in one embodiment precedes a frame synchronization field of $INFO_1$ and the number of fill bits indicating a first type of modem is thirteen.

In a further aspect of the present invention, a method is provided for adjusting a communication configuration for a communication session based on a protocol having an associated set of constellation points with a remote modem based on a type of the remote modem. The adjustment may be selected from various design type specific communication configuration options intended to improve performance of the modem for the communication session. The Total Harmonic Distortion (THD) threshold for falling back to V.34 communications may be set based on a type of the remote modem when the remote modem is a type of modem which supports only up to two bit look ahead for spectrum shaping. Selected constellation points of the associated set of constellation points may be excluded when the remote modem is a type of modem which modifies at least one of the selected constellation points in a manner not specified by the protocol. The use of longer than normal duration Digital Impairment Learning (DIL) sequences for high power mode may be disabled when the remote modem is a type of modem which has an associated retrain timer period shorter than a timer period specified by the protocol. Finally, an adaptation step size for use in equalizer convergence operations may be selected based on a type of the remote modem when the remote modem is a type of modem which provides a curve fitting error at a specified symbol rate that corresponds to a length of a local loop supporting the communication session.

More particularly, the protocol in a preferred embodiment in V.90 standard protocol. A lower THD threshold may be set when the remote modem is a type of modem which only supports up to 2 bit look ahead for spectrum shaping. The elected constellation points may be excluded based on a detected digital pad. In one embodiment, Ucode 86 and Ucode 102 constellation points are excluded if the detected digital pad is between about 2.7 dB and about 3.5 dB and Ucode 95 constellation points are excluded if the detected digital pad is between about 6.00 dB and about 6.02 dB. Constellation points in a further embodiment are excluded by setting learned levels associated with the excluded selected constellation points to about zero (and preferably zero) in a learned DIL sequence. In another embodiment, the specified symbol rate is 3429 and a larger adaptation step size is selected if the curve fitting error is below a predetermined threshold criterion.

As will further be appreciated by those of skill in the art, while described above primarily with reference to method aspects, the present invention may be embodied as methods, apparatus/systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention is typically written in a high level programming language such as C or C++. Nevertheless, some modules or routines may be written in assembly or machine language to optimize speed, memory usage, or layout of the software or firmware in memory. Assembly language is typically used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

It has been discovered by the present inventors that different modem design types provided by various vendors, particularly V.34 and V.90 standard modems, often have unique advantages and weaknesses associated with the particular designs apart from the optional feature capabilities specifically provided for by the industry specifications, such as the V.90 standard and the V.34 standard. As used herein the term "type" with reference to a modem refers to a modem design having a specific communication characteristic (as will be more fully described herein with reference to types A, B, C and D or to a brand type from a particular vendor (manufacturer). However, it is to be understood that the brand type designation extends not only to the modems sold by a particular vendor under that vendor's brand name but also to modems from other vendors which may carry a different brand association but which have the same design characteristics as those of the original vendor.

Deviations in particular modem types from industry standards may cause problems in establishing a desirable communication session when the call and answer modem are not aware of the design type differences between the respective modems. If the modem design type is known, special measures may be taken to provide improved reliability and robustness for communication sessions supported by various different modem types. Accordingly, the present invention, as will be described further herein, provides for identification of particular modem types as well as appropriate adaptations to a communication configuration for a communication session where the design type of a remote modem is known.

In particular, the present inventors have identified unique design characteristics of four different types for which communication characteristics of a modem may be modified to improve the likelihood of providing a reliable and robust connection. The first type, referred to herein as a type A modem, is characterized by a design which does not set one of its retrain timers long enough so that if the modem attempts to request a longer DIL sequence so as to allow the DIL sequence to include higher power DIL levels from Ucode 111 to 120 (of the V.34/V.90 standard) for a high power mode (such as that required for the support of higher than −12 dBm0 maximum digital modem transmit power limit), a type A modem would typically time out and request a retrain. The use of high power mode is further described in a commonly assigned patent application Ser. No. 09/430,678 entitled "Modems Having A Dual Power Mode Capability and Methods of Operating Same". Examples of type A modems having such a design characteristic include V.90 and V.34 modems from Rockwell Corporation.

A second type of modem design type, referred to herein as a type B modem, is a modem which supports only up to 2 look ahead for spectrum shaping. In other words, modems which do not support 3 look ahead for spectrum shaping shall be referred to herein as a type B modem. The V.90 standard provides for support of 0, 1, 2 or 3 of look ahead for the shaping of downstream pulse amplitude modulated (PAM) signals with only 0 and 1 as mandatory for the server modem to implement.

A third type of modem, referred to herein as a type C modem, is characterized by a design in which the modem modifies one or more of the communication constellation points using a modification rule that does not follow the V.90 standard. More particularly, a type C modem is characterized in that it excludes some of the constellation points for certain PADs. An example of such a modem would include the V.90 modem from U.S. Robotics Corporation.

A fourth type of modem, referred to herein as a type D modem, is characterized by a design in which the line probing signal is designed so that the curve fitting error at a 3429 symbol rate contains information about the length of the local loop to which the modem is coupled acting as client modem under the V.90 standard. More particularly, the curve fitting error at the 3429 symbol rate typically gets higher with increases in length of the local loop. An example of a modem having this design characteristic is the V.90 modem from U.S. Robotics Corporation. As is evident from the description herein, it is to be understood that a particular manufacturer's modem design may fall within none, one or more of the types of modems as described herein.

Finally, in the context of the modem type detection aspects of the present invention, the inventors have discovered that a particular (first) type of modem has a unique associated fill bit pattern which it transmits when operating pursuant to the V.90 standard. More particularly, this first type of modem sends 13 fill bits preceding the $INFO_1$ frame synchronization field instead of sending only 4 fill bits as specified in the V.90 standard at Tables 9 and 10. Example of such a first type modem include the V.90 and V.34 modems from Rockwell Corporation.

Figure 3:
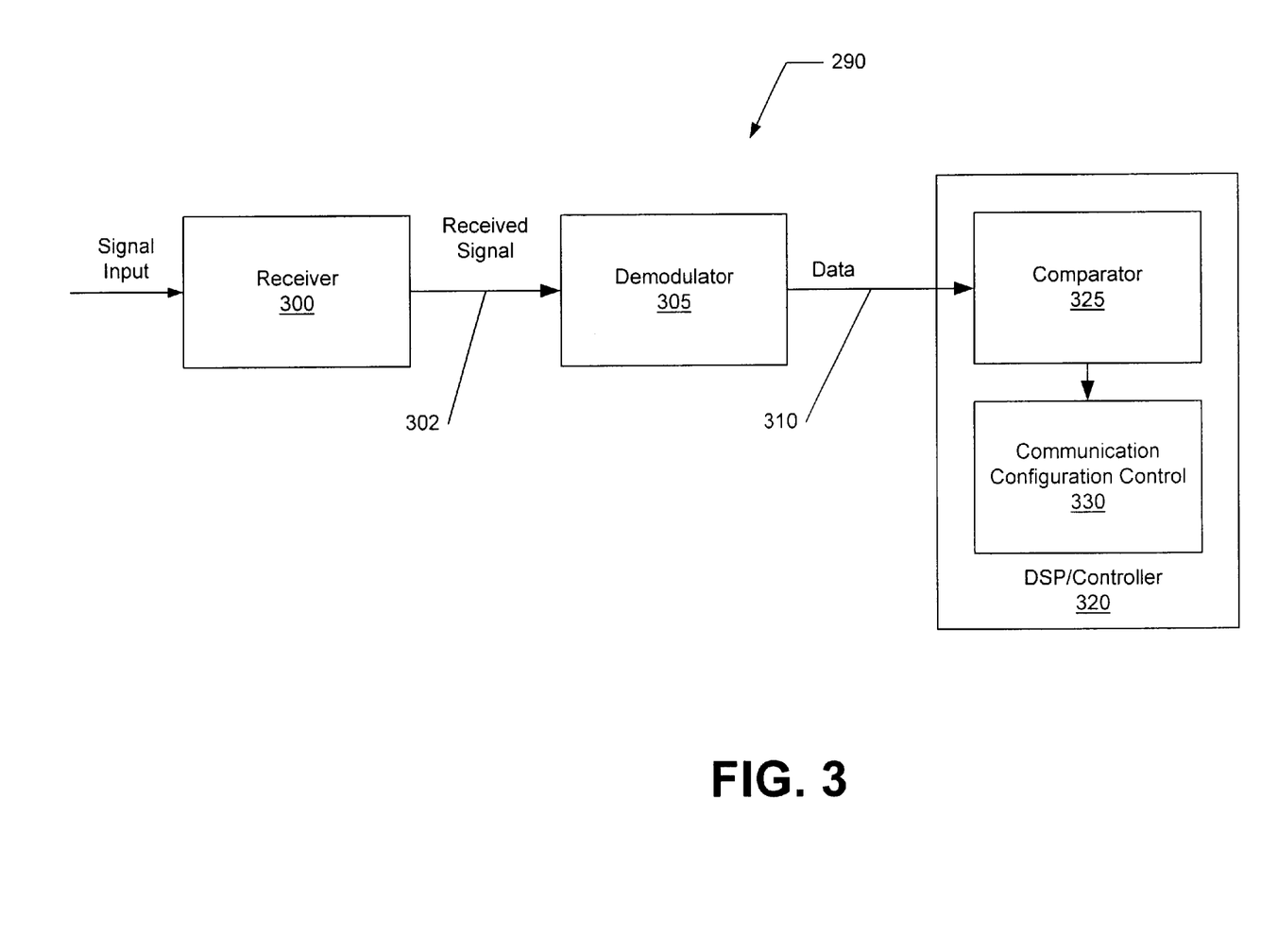
FIG. 3 is a block diagram of a modem circuit in accordance with an embodiment of the present invention.

The present invention will now be further described with reference to the block diagram illustration of an embodiment of systems for detection of a remote modem and for adjusting a communication configuration for a communication session based on a type of the remote modem of FIG. 3. As shown in the embodiment of FIG. 3, the modem circuit 290 includes the receiver 300 which receives a signal input, such as over a public switched telephone network (PSTN) and outputs a received signal 302. The received signal 302 is provided to the demodulator 305 which demodulates the received signal to provide data 310 associated with the received signal 302.

The data 310 is provided by the demodulator 305 to the comparator circuit 325 which, in the illustrated embodiment of FIG. 3, is implemented within the digital signal processor (DSP) (or other type controller) 320. The comparator circuit 325 provides a means for comparing the data associated with the received signal 302 with unique associated modem type data to determine whether the remote modem communicating the received signal 302 is the first type or brand of modem. More particularly, as described above with reference to the first type of modem having 13 fill bits, the comparator circuit 325 counts the number of fill bits preceding the INFO$_1$ frame synchronization field to determine if 13 rather than 4 fill bits are present. If the comparator circuit 325 detects the existence of 13 fill bits preceding the frame synchronization field of the INFO$_1$ signal, the modem circuit 290 declares that the remote communicating V.90 modem, is a first type modem.

As described above, in the case of the exemplary Rockwell Corporation V.90 and V.34 modems, recognition of the 13 fill bits in the received signal further allows the modem circuit 290 to identify the remote or (server) modem as a type B modem (which supports only one or two look ahead for spectrum shaping) and further as a type A modem (which does not set one of its retrain timers long enough to support a longer DIL sequence without timing out and requesting a retrain). It follows that the modem circuit 290 is further able to determine that the remote modem having transmitted 13 fill bits is not a type C modem or a type D modem. The modem type information from the comparator circuit 325 is provided to the communication configuration control circuit 330 which provides a means for adjusting the communication configuration for a communication session with the remote modem based on the type of modem.

As shown in the embodiment of FIG. 3 where the comparator circuit 325 and the communication configuration control circuit 330 are contained within the DSP 320, it is to be understood that the various components illustrated as separate blocks within FIG. 3 may be implemented in hardware, in software, in custom designed chips or in a combination of the above. More particularly, the comparator circuit 325 and the communication configuration control circuit 330 may be implemented as code executing on a controller device such as the DSP 320. Similarly, the receiver 300 and the demodulator 305 may be combined and may be implemented in hardware, software or a combination of the above.

Figure 4:
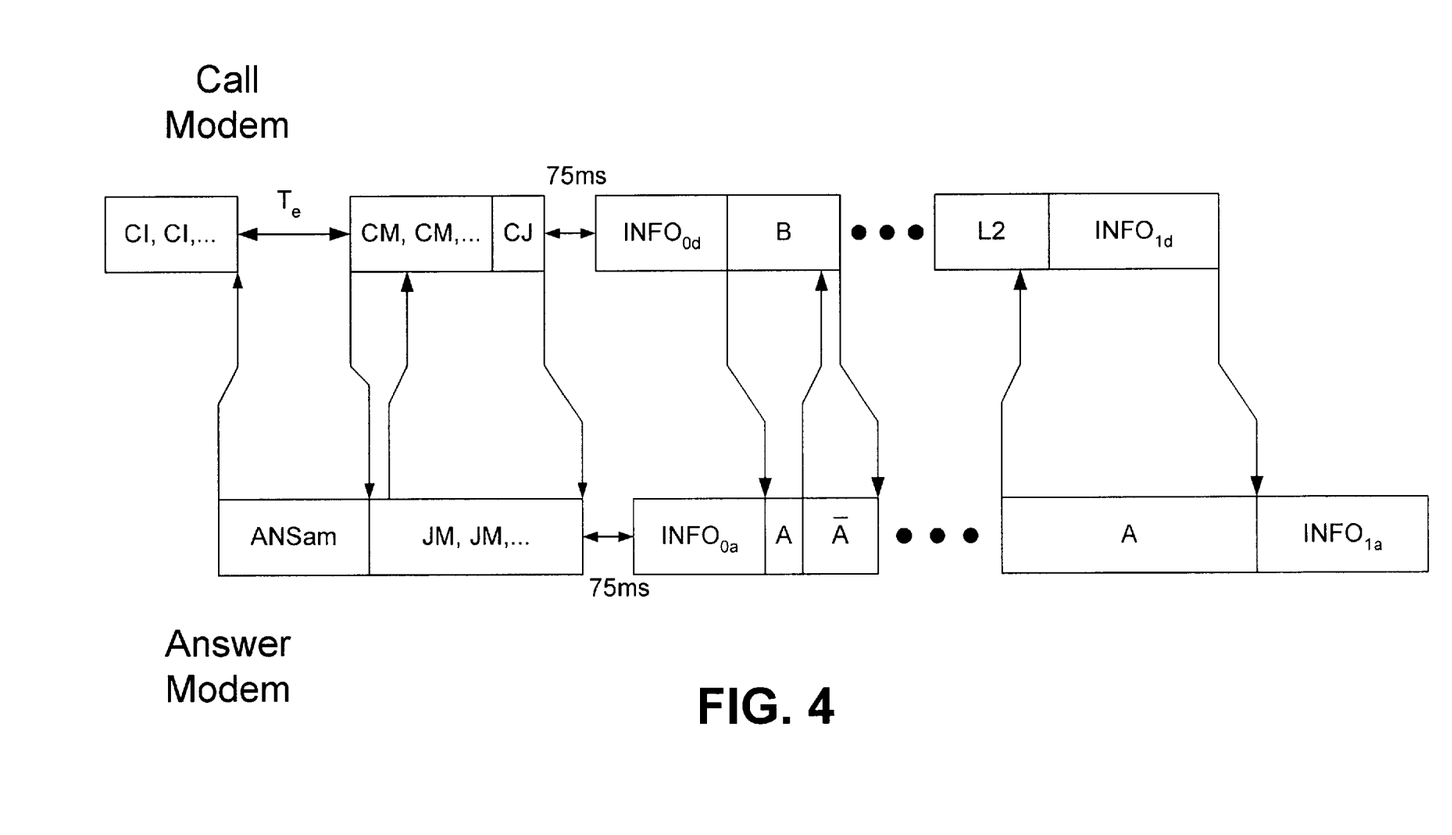
FIG. 4 is a signal sequencing diagram illustrating the exchange of messages and tones between a call modem and an answer modem during phase 1 and phase 2 operations pursuant to the V.90 standard.

The modem type determination aspects of the present invention will now be further explained with reference to FIG. 4 which illustrates tone and message transmissions for a call modem and answer modem pursuant to the first two phases of a start up protocol. In the illustration of FIG. 4, the client/analog modem acts as the call modem which transmits CI (or CT or CNG) and conditions its receiver to detect the answer signal ANSam (or ANS) as per the V.8 protocol recommendation. After the signal ANSam is detected, the call modem transmits silence for the period T$_e$. The call modem then conditions its receiver to detect JM and transmits the signal CM with the appropriate bit set to indicate that V.90 operation is desired. When a minimum of two identical JM sequences have been received, the call modem completes the current CM octet and sends CJ. After sending CJ, the call modem transmits silence for 75 milliseconds plus or minus 5 milliseconds before proceeding with the phase 2 signal procedures.

As shown in FIG. 4, the phase 2 signals from the call modem begin with transmission of the INFO$_0$ signal. A tone phase reversal sequence follows, only partly illustrated in FIG. 4, supporting line probing and ranging operations. Phase 2 concludes with transmission of the INFO, signal by the respective call and answer modems. The contents of the INFO, signal for the call and receive modems are specified in Tables 9 and 10 of the V.90 standard. A preferred embodiment of the present invention utilizes the fill bits preceding the frame synchronization field to identify a first type of modem. As shown in Table 10 of the V.90 standard, the frame synchronization field is from bit positions 4 through 11 and is preceded by fill bits in bit positions 0 through 3. In contrast, for modems of the first type, such as V.34 and V.90 modems from Rockwell Corporation, 13 fill bits are found in the INFO$_{1d}$ signal received by the answer (analog) modem.

Figure 5:
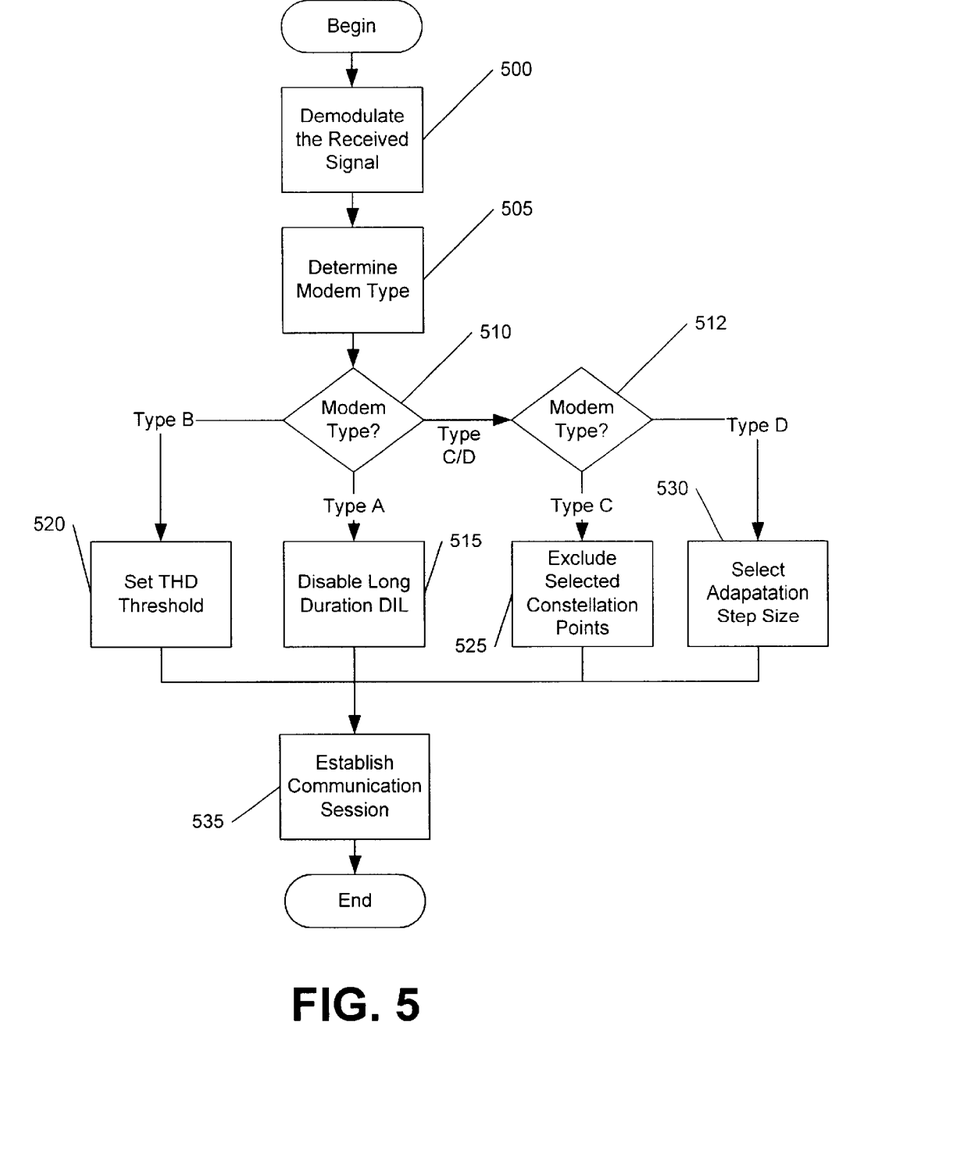
FIG. 5 is a flowchart illustrating operations for identification of a modem type and adjustment of a communication configuration based on modem type according to an embodiment of the present invention.

Operations according to an embodiment of the present invention will now be described with reference to the flow chart illustration of FIG. 5. As shown in FIG. 5, operations begin at block 500 when a received signal from a remote modem is demodulated to provide data associated with the received signal. A design type of the remote modem is then determined by comparing the data associated with the received signal with the unique associated modem type data to determine whether the remote modem is a first type of modem (block 505). Note that, as used herein, the term "unique" refers to a data pattern which is characteristic of a modem type (herein a brand association of type) but which is distinct from the various support characteristics specifically provided for by the protocol in use between the receiving modem and the remote modem. Accordingly, operations at blocks 500 and 505 provide a method for detecting at a local modem whether a remote modem is a first type of modem where the first type of modem has a unique associated modem type data.

Further operations related to adjusting a communication configuration for a communication session with a remote modem based on a type of the remote modem will now be described. With respect to this aspect of the present invention, it is to be understood that the operations related to determining a modem type as described for block 505 above may be utilized. Alternatively, operations at block 505 for determining a modem type may be based on other approaches known to those of skill in the art including having a table stored in a memory of the local modem which associates various server modems accessed by the local modem with the design type of such modems. This information may be developed by the local user over time or may be provided by the manufacturer or vender of the local modem with the modem. In any event, operations begin at block 510 with the local modem having knowledge of the modem type of the remote modem.

If the remote modem is a type A modem (block 510), use of a longer than normal duration digital impairment learning (DIL) sequence for high power mode is disabled as a type A modem is a type of modem which has an associated retrain timer period shorter than a timer period specified by the communication protocol controlling the communication session (block 515). More particularly, even though a time duration for a longer DIL sequence may be specified for higher power mode which is well within what is allowed under the V.90 standard, type A modems will typically timeout and request a retrain if such a feature is utilized. Accordingly, at block 515, the local modem forces use of a normal length DIL sequence even for high power mode operations.

As a consequence, for some of the larger digital PADs, the local modem may not be able to support full power boosts. This limitation is due to the short retrain timer time set by the manufacturer of the type A modem. However, utilization of the type information beneficially allows the local modem to correct for this characteristic of the type A modem without having to resort to the use of normal length DIL sequences for all remote modem types which would unnecessarily result in potential performance limitations for other modem types. According to the present invention, other modem types than type A may continue to utilize longer DIL sequences to support full power boosts in a high power mode. This may result in higher data rates for the user on the communication session.

If the remote modem is a type B modem (block 510), a Total Harmonic Distortion (THD) threshold for falling back to V.34 communications is set based on the type of the remote modem (block 520). More particularly, as described previously, a type B modem only supports up to 2 look ahead for spectrum shaping which may not be enough to avoid significant nonlinear distortions at low frequencies. Accordingly, a different threshold is set for falling back to V.34 in phase 2 startup procedures of a V.90 modem based on the modem type of the remote modem. Modems which do support 3 look ahead may beneficially utilize a higher THD threshold for falling back to V.34 during phase 2 startup procedures. Accordingly, the local modem may be able to achieve V.90 connections successfully on lines with relatively high THD when connecting to modems supporting 3 look ahead for downstream PAM spectrum shaping which typically better handles the nonlinear distortions at low frequencies. On the other hand, when the local modem is connected to server modem types which do not support 3 look ahead, the information on the modem type is used to initiate setting a lower THD threshold to insure that the local modem should be able to make reliable V.34 connections.

If the remote modem is a type C modem (block 512), the communication configuration is adjusted by excluding selected constellation points from the associated set of constellation points provided by the protocol used for the communication session (such as V.90 protocol) (block 525). This adaptation is provided as type C modems modify one or more of the constellation points pursuant to modification rules which do not follow the protocol of the communication session.

To explain further, the V.90 standard provides the client (local) modem exclusive rights as to what constellation points it chooses to use by letting the client modem analyze the DIL sequence it requests to be sent from the server modem and choose the optimum constellation points it prefers by setting the constellation masks in CP sequences which will in turn be transmitted to the server modem in phase 4 startup procedures. The server modem is then expected to send the constellation the client modem requested in constellation masks in CP sequence without any modifications. Type C modems, however, have been found to exclude some of the constellation points for certain digital PADs. If the client modem is unaware of this unique characteristic of the server (remote) modem for type C modems, it may result in significant error events and unreliable connections.

A particular example of exclusion pursuant to the present invention in the context of a V.90 protocol modem session is as follows. After identification of a type C modem as the server modem and following DIL learning, an excluding function is performed on the learned DIL levels by the following rules:

1. If the detected digital PAD is within about 2.78 dB to 3.5 dB (and more preferably between about 2.78 dB and 3.44 dB), exclude operations exclude Ucode 86 and Ucode 102.

2. If the detected digital PAD is between about 6.00 dB and about 6.02 dB, Ucode 95 is excluded.

3. Otherwise, no constellation points are excluded.

In a preferred embodiment of the present invention the exclusion operation is performed by setting the learned levels corresponding to the excluded Ucodes in all the 6 intervals specified in the V.90 protocol to be about 0 (and preferably 0) in the learned DIL sequence. The subsequent constellation generation operations will then be expected to exclude the use of these points based on seeing that the learned levels are 0. Accordingly, knowledge of the remote (server) modem type allows the local (client) modem to make decisions about whether or not exclusion of particular constellation points should be performed. Error events and unreliable connections may thereby be avoided while not requiring the exclusion unnecessarily of such points for other modem types which may, in turn, allow such other modem types to achieve higher data rates or lower error rates through the use of a broader range of constellation points by the constellation generation algorithms of the modems.

Finally, if the remote modem is a type D modem (block 512), an adaptation step size for use in equalizer convergence operations is selected based on the type of the remote modem (block 530). This communication configuration option is provided as type D modems, as described above, provide a curve fitting error at a specified symbol rate that corresponds to a length of a local loop supporting the communication session.

Accordingly, the present invention allows for the use of the different design points for line probing sequence characteristics of different modem types to achieve improved receiver performance. More particularly, a type D modem, such as the V.90 modem from US Robotics Corporation, includes a line probing signal which is designed so that the curve fitting error at a 3429 symbol rate contains information about the length of the local loop. More particularly, the curve fitting error at the 3429 symbol rate gets higher with greater local loop length. Such information is not necessarily readily available from other modem types. Accordingly, to optimize the equalizer convergence knowing that the remote modem is a type D modem, the local modem may select use of a different adaptation step size. For example, if the curve fitting error at the 3429 symbol rate level is below a predetermined threshold (indicating that the local loop is relatively short) a different, preferably larger, adaptation step is chosen to facilitate optimization for shorter local loops. For longer local loops or if the server (remote) modem is not identified as a type D modem, the normal adaptation step size is provided to support reliable equalizer convergence. More optimized equalizer convergence for connections with type D modems may, in turn, result in a better Signal to Noise Ratio (SNR) and/or a higher connection speed and/or a lower error rate for the particular communication session.

After adjusting the communication configuration as described above with reference to blocks 510–530, operations move to block 535. As indicated at block 535, the modem establishes and operates the respective communication session utilizing the communication configuration previously established. It is to be understood that, while operations in reference to FIG. 5 have been presented primarily with reference to a client modem as the local modem, the present invention may similarly be provided for use in controlling communication configuration and identification of a remote modem type by a server modem.

The present invention has been described above with reference to the block diagram illustration of FIG. 3. and the flowchart illustration of FIG. 5. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described herein above without substantially departing from the principles of the present invention. All such variations and modifications are intended to be included herein within the scope of the present invention, as set forth in the following claims.

We claim:

1. A method for detecting at a local modem whether a remote modem is a first type of modem, the first type of modem having a unique associated modem type data and the local modem and the remote modem are each either a V.34 modem or a V.90 modem, comprising the steps of:
    demodulating a received phase 2 start-up signal from the remote modem to provide data associated with the received signal; and
    comparing the data associated with the received signal with the unique associated modem type data to determine whether the remote modem is a first type of modem.

2. The method of claim 1 wherein the received signal is a fill bit field of $INFO_1$ and wherein the demodulating step further comprises the step of providing a number of fill bits associated with the fill bit field as the data associated with the received signal.

3. The method of claim 2 wherein the comparing step further comprises the step of determining that the remote modem is a first type of modem based on the number of fill bits associated with the fill bit field.

4. The method of claim 3 wherein the fill bit field precedes a frame synchronization field of $INFO_1$ and the number of fill bits is thirteen.

5. The method of claim 2 wherein the determining step is followed by the step of adjusting a communication configuration for a communication session with the remote V.90 modem when the remote modem is a first type modem.

6. The method of claim 4, wherein the adjusting step comprises the step of disabling use of longer than normal duration Digital Impairment Learning (DIL) sequences for high power mode when the remote modem is a first type of modem.

7. A method for adjusting a communication configuration for a communication session based on a protocol having an associated set of constellation points with a remote modem based on a type of the remote modem comprising at least one of the following steps:
    setting a Total Harmonic Distortion (THD) threshold for falling back to V.34 communications based on a type of the remote modem when the remote modem is a type of modem which only Supports up to 2 look ahead for spectrum shaping;
    excluding selected constellation points of the associated set of constellation points when the remote modem is a type of modem which modifies at least one of the selected constellation points in a manner not specified by the protocol;
    disabling use of longer than normal duration Digital Impairment Learning (DIL) sequences for high power mode when the remote modem is a type of modem which has an associated retrain timer period shorter than a timer period specified by the protocol; and
    selecting an adaptation step size for use in equalizer convergence operations based on a type of the remote modem when the remote modem is a type of modem which provides a curve fitting error at a specified symbol rate that corresponds to a length of a local loop supporting the communication session.

8. The method of claim 7 wherein the protocol is V.90.

9. The method of claim 8 wherein the setting a THD threshold step comprises the step of setting a lower THD threshold when the remote modem is a type of modem which only supports up to 2 look ahead for spectrum shaping.

10. The method of claim 8 wherein the excluding step further comprises the step of excluding selected constellation points based on a detected digital pad.

11. The method of claim 10 wherein the excluding step comprises the steps of:
    excluding Ucode 86 and Ucode 102 constellation points if the detected digital pad is between about 2.7 dB and about 3.5 dB; and
    excluding Ucode 95 constellation points if the detected digital pad is between about 6.00 dB and about 6.02 dB.

12. The method of claim 10 wherein the excluding step further comprises the step of setting learned levels associated with the excluded selected constellation points to about zero in a learned DIL sequence.

13. The method of claim 8 wherein the specified symbol rate is 3429 and wherein the selecting step further comprises the step of selecting a larger adaptation step size if the curve fitting error is below a predetermined threshold criterion.

14. A system for detecting at a local modem whether a remote modem is a first type of modem, the first type of modem having a unique associated modem type data, and the local modem and the remote modem are each either a V.34 modem or a V.90 modem comprising:
    means for demodulating a received phase 2 start-up signal from the remote modem to provide data associated with the received signal; and means for comparing the data associated with the received signal with the unique associated modem type data to determine whether the remote modem is a first type of modem.

15. The system of clam 13, wherein the received signal is a fill bit field of $INFO_1$ and wherein the means for demodulating further comprises means for providing a number of fill bits associated with the fill bit field as the data associated with the received signal.

16. The system of claim 15 wherein the means for comparing further comprises means for determining that the remote modem is a first type of modem based on the number of fill bits associated with the fill bit field.

17. The system of claim 16 wherein the fill bit field precedes a frame synchronization field of $INFO_1$ and the number of fill bits is thirteen.

18. The system of claim 15 further comprising means for adjusting a communication configuration for a communication session with the remote V.90 modem when the remote modem is a first type of modem.

19. The system of claim 18 wherein the means for adjusting comprises means for disabling use of longer than normal duration Digital Impairment Learning (DIL) sequences for high power mode when the remote modem is a first type modem.

20. A system for adjusting a communication configuration for a communication session based on a protocol having an associated set of constellation points with a remote modem based on a type of the remote modem comprising at least one of the following:
   means for setting a Total Harmonic Distortion (THD) threshold for falling back to V.34 communications based on a type of the remote modem when the remote modem is a type of modem which only supports up to 2 look ahead for spectrum shaping;
   means for excluding selected constellation points of the associated set of constellation points when the remote modem is a type of modem which modifies at least one of the selected constellation points in a manner not specified by the protocol;
   means for disabling use of longer than normal duration Digital Impairment Learning (DIL) sequences for high power mode when the remote modem is a type of modem which has an associated retrain timer period shorter than a timer period specified by the protocol; and
   means for selecting an adaptation step size for use in equalizer convergence operations based on a type of the remote modem when the remote modem is a type of modem which provides a curve fitting error at a specified symbol rate that corresponds to a length of a local loop supporting the communication session.

21. The system of claim 20 wherein the protocol is V.90.

22. The system of claim 21 wherein the means for setting a THD threshold comprises means for setting a lower THD threshold when the remote modem is a type of modem which only supports up to 2 look ahead for spectrum shaping.

23. The system of claim 21 wherein the means for excluding further comprises means for excluding selected constellation points based on a detected digital pad.

24. The system of claim 23 wherein the means for excluding comprises:
   means for excluding Ucode 86 and Ucode 102 constellation points if the detected digital pad is between about 2.7 dB and about 3.5 dB; and means for excluding Ucode 95 constellation points if the detected digital pad is between about 6.00 dB and about 6.02 dB.

25. The system of claim 23 wherein the means for excluding further comprises means lot setting learned levels associated with the excluded selected constellation points to about zero in a learned DIL sequence.

26. The system of claim 21 wherein the specified symbol rate is 3429 and wherein the means for selecting further comprises means for selecting a larger adaptation step size if the curve fitting error is below a predetermined threshold criterion.

27. A computer program product for detecting at a local modem whether a remote modem is a first type of modem, the first type of modem having a unique associated modem type data and the local modem and the remote modem are each either a V.34 modem or a V.90 modem, comprising:
   a computer readable storage medium having computer readable program code means embodied therein, the computer readable code means comprising:
   computer readable code that demodulates a received phase 2 start-up signal from the remote modem to provide data associated with the received signal; and
   computer readable code that compares the data associated with the received signal with the unique associated modem type data to determine whether the remote modem is a first type of modem.

28. The computer program product of claim 25, wherein the received signal is a fill bit field of $INFO_1$ and wherein the computer readable code that demodulates further comprises computer readable code that provides a number of fill bits associated with the fill bit field as the data associated with the received signal.

29. The computer program product of claim 28 wherein the computer readable code that compares further comprises computer readable code that determines that the remote modem is a first type of modem based on the number of fill bits associated with the fill bit field.

30. The computer program product of claim 29 wherein the fill bit field precedes a frame synchronization field of $INFO_1$ and the number of fill bits is thirteen.

31. The computer program product of claim 28 further comprising computer readable code that adjusts a communication configuration for a communication session with the remote V.90 modem when the remote modem is a first type of modem.

32. The computer program product of claim 31 wherein the computer readable code that adjusts comprises computer readable code that disables use of longer than normal duration Digital Impairment Learning (DIL) sequences for high power mode when the remote modem is a first type modem.

33. A computer program product for adjusting a communication configuration for a communication session based on a protocol having an associated set of constellation points with a remote modem based on a type of the remote modem comprising at least one of the following:
   a computer readable storage medium having computer readable program code means embodied therein, the computer readable code means comprising:
   computer readable code that sets a Total Harmonic Distortion (THD) threshold for falling back to V.34 communications based on a type of the remote modems when the remote modem is a type of modem which only supports up to 2 look ahead for spectrum shaping;
   computer readable code that excludes selected constellation points of the associated set of constellation points when the remote modem is a type of modem which modifies at least one of the selected constellation points in a manner not specified by the protocol;

computer readable code that disables use of longer than normal duration Digital Impairment Learning (DIL) sequences for high power mode when the remote modem is a type of modem which has an associated retrain timer period shorter than a timer period specified by the protocol; and computer readable code that selects an adaptation step size for use in equalizer convergence operations based on a type of the remote modem when the remote modem is a type of modem which provides a curve fitting error at a specified symbol rate that corresponds to a length of a local loop supporting the communication session.

34. The computer program product of claim 33 wherein the protocol is V.90.

35. The computer program product of claim 34 wherein the computer readable code that sets a THD threshold comprises computer readable code that sets a lower THD threshold when the remote modem is a type of modem which only supports up to 2 look ahead for spectrum shaping.

36. The computer program product of claim 34 wherein the computer readable code that excludes further comprises computer readable code that excludes selected constellation points based on a detected digital pad.

37. The computer program product of claim 36 wherein the computer readable code that excludes comprises:

computer readable code that excludes Ucode 86 and Ucode 102 constellation points if the detected digital pad is between about 2.7 dB and about 3.5 dB; and computer readable code that excludes Ucode 95 constellation points if the detected digital pad is between about 6.00 dB and about 6.02 dB.

38. The computer program product of claim 36 wherein the computer readable code that excludes further comprises computer readable code that sets learned levels associated with the excluded selected constellation points to about zero in a learned DIL sequence.

39. The computer program product of claim 34 wherein the specified symbol rate is 3429 and wherein the computer readable code that selects further comprises computer readable code that selects a larger adaptation step size if the curve fitting error is below a predetermined threshold criterion.

* * * * *